(12) United States Patent
Agari et al.

(10) Patent No.: US 10,412,908 B2
(45) Date of Patent: Sep. 17, 2019

(54) HYDROPONIC SYSTEM

(71) Applicant: TOYO SEIKAN GROUP HOLDINGS, LTD., Tokyo (JP)

(72) Inventors: Jun Agari, Tokyo (JP); Katsuhiro Muramoto, Tokyo (JP); Kunio Murai, Yatomi (JP); Takahiro Kamiya, Yatomi (JP); Shinichirou Matsumoto, Tokyo (JP); Kazuto Yoshimura, Tokyo (JP); Akihiko Fujiwara, Osaka (JP); Shinji Kubo, Osaka (JP); Mari Nishi, Kudamatsu (JP); Akane Itoh, Kudamatsu (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 191 days.

(21) Appl. No.: 15/524,302

(22) PCT Filed: Sep. 29, 2015

(86) PCT No.: PCT/JP2015/004922
§ 371 (c)(1),
(2) Date: May 4, 2017

(87) PCT Pub. No.: WO2016/072042
PCT Pub. Date: May 12, 2016

(65) Prior Publication Data
US 2017/0311560 A1  Nov. 2, 2017

(30) Foreign Application Priority Data
Nov. 5, 2014 (JP) ................... 2014-224934

(51) Int. Cl.
*A01G 31/04* (2006.01)
*A01G 31/02* (2006.01)
*A01G 9/02* (2018.01)

(52) U.S. Cl.
CPC ............. *A01G 31/04* (2013.01); *A01G 31/02* (2013.01); *A01G 9/025* (2013.01); *Y02P 60/216* (2015.11); *Y02P 60/244* (2015.11)

(58) Field of Classification Search
CPC ........ A01G 31/00; A01G 31/02; A01G 31/04; A01G 31/06; A01G 31/045; A01G 7/045;
(Continued)

(56) References Cited

U.S. PATENT DOCUMENTS 6,000,173 A * 12/1999 Schow ................ A01G 31/02
47/59 R
2013/0298445 A1 * 11/2013 Aoki ..................... A01M 1/04
43/132.1
(Continued)

FOREIGN PATENT DOCUMENTS

CN  1088383 A  6/1994
CN  203136711 U  8/2013
(Continued)

OTHER PUBLICATIONS

International Search Report for application No. PCT/JP2015/004922 dated Nov. 17, 2015.
(Continued)

*Primary Examiner* — Kathleen I Alker
(74) *Attorney, Agent, or Firm* — Sughrue Mion, PLLC

(57) ABSTRACT

A hydroponic system (1) is provided with a light-collecting apparatus (3) having a pair of reflecting plates (31a) that are vertically arranged in parallel with a culture surface (23) of a culture panel (21) of a hydroponic unit (2). During a process in which natural light taken from a light-collecting opening (30) propagates while repeatedly reflected by opposing reflecting surfaces of a reflecting plates (31a), by allowing seedlings p that are transplanted into the culture panel (21) to be irradiated with the light through a light-
(Continued)

emitting hole (32) bored in the reflecting plate (31*a*), a culture object can be grown efficiently at a low cost by taking natural light from the outside.

5 Claims, 8 Drawing Sheets

(58) Field of Classification Search
CPC ........ A01G 9/20; A01G 9/0249; A01G 9/025; G02B 6/00; Y02P 60/216; Y02P 60/244
See application file for complete search history.

(56) References Cited

U.S. PATENT DOCUMENTS

| | | | |
|---|---|---|---|
| 2013/0305601 A1* | 11/2013 | Park | A01G 31/04 47/17 |
| 2014/0144079 A1 | 5/2014 | Lin | |
| 2015/0351329 A1* | 12/2015 | Heidl | A01G 9/023 211/49.1 |
| 2018/0206414 A1* | 7/2018 | Goodman | A01G 9/022 |

FOREIGN PATENT DOCUMENTS

| | | |
|---|---|---|
| EP | 1 210 868 A1 | 6/2002 |
| EP | 2489256 A2 | 8/2012 |
| JP | 8-331991 A | 12/1996 |
| JP | 9-98665 A | 4/1997 |
| JP | 2000-217451 A | 8/2000 |
| JP | 2004-97172 A | 4/2004 |
| WO | 00/44220 A1 | 8/2000 |

OTHER PUBLICATIONS

Machine translation of JP 9-98665 A published Apr. 15, 1997, previously submitted on May 4, 2017.
Machine translation of JP 2004-97172 A published Apr. 2, 2004, previously submitted on May 4, 2017.
Machine translation of JP 8-331991 A published Dec. 17, 1996, previously submitted on May 4, 2017.
Machine translation of JP 2000-217451 A published Aug. 8, 2000, previously submitted on May 4, 2017.
International Preliminary Report on Patentability with translation of Written Opinion dated May 18, 2017, issued by the International Searching Authority in application No. PCT/JP2015/004922.
Communication dated May 7, 2018, from the European Patent Office in counterpart application No. 15856953.3.

* cited by examiner

HYDROPONIC SYSTEM

CROSS REFERENCE TO RELATED APPLICATIONS

This application is a National Stage of International Application No. PCT/JP2015/004922, filed on Sep. 29, 2015, which claims priority from Japanese Patent Application No. 2014-224934, filed on Nov. 5, 2014, the contents of all of which are incorporated herein by reference in their entirety.

TECHNICAL FIELD

The present invention relates to a hydroponic system that can grow plants efficiently at a low cost and at a high culture density by taking natural light from the outside.

BACKGROUND ART

In recent years, in order to attain stable food supply, expectation has been drawn to plant factories that grow plants such as leafy vegetables in indoor facilities by hydroponic culture without being influenced by the weather, and various techniques have been proposed in this regard.

For example, Patent Document 1 proposes a hydroponic system in which culture panels in which a large number of holes are bored and seedlings are retained in each hole are vertically arranged in multiple stages, and panels are moved by sliding from top to bottom so that only the lowermost panel can be removed, whereby panels in which plants are ready to be harvested are sequentially removed. In the hydroponic system of Patent Document 1, since plants can be grown in a completely controlled environment in an enclosed space isolated from the outside, there is no fear of invasion by pathogenic bacteria and pests, and hence, spraying pesticides is not necessary. As a result, there are advantages that safe and stable production without use of pesticides can be attained, etc.

RELATED ART DOCUMENTS

Patent Document

Patent Document 1: WO00/44220 pamphlet

DISCLOSURE OF THE INVENTION

Problems to be Solved by the Invention

However, in order to grow plants in a closed space as in the case of the hydroponic system of Patent Document 1, artificial light sources such as fluorescent lamps and light-emitting diodes are required to be installed in order to irradiate light necessary for the growth of plants. Therefore, not only high electricity cost is incurred, but also care has to be taken in order to prevent plants from being affected by heat emitted from these light sources.

Under such circumstances, the inventors made extensive studies in order to suppress an increase in cost such as electricity cost, and as well as to avoid unfavorable effects exerted by artificial light sources on plants by taking natural light from the outside and irradiating plants to be grown with the natural light instead of light emitted from artificial light sources. The present invention has been completed as a result of these studies.

The present invention is aimed at providing a hydroponic system that can grow plants as a culture object efficiently at a low cost and at a high culture density by taking natural light.

Means for Solving the Problem

The hydroponic system of the present invention has a configuration in which the hydroponic system is provided with a hydroponic unit in which culture panels into which seedlings as a culture object are transplanted are vertically arranged, and a light-collecting apparatus that takes natural light from the outside and irradiates the seedlings transplanted into the culture panel with the natural light, wherein the light-collecting apparatus has a pair of reflecting plates that are vertically provided in parallel with the culture surface of the culture panel provided in the hydroponic unit, and the seedlings transplanted into the culture panel are irradiated with the natural light taken from a light-collecting opening through a light-emitting hole bored in the light-reflecting plate during a process in which it propagates while repeatedly being reflected by opposing reflecting surfaces of the reflecting plates.

Advantageous Effects of the Invention

According to the present invention, it is possible to grow a culture object efficiently at a low cost and at a high culture density by taking natural light from the outside.

MODE FOR CARRYING OUT THE INVENTION

Figure 1:
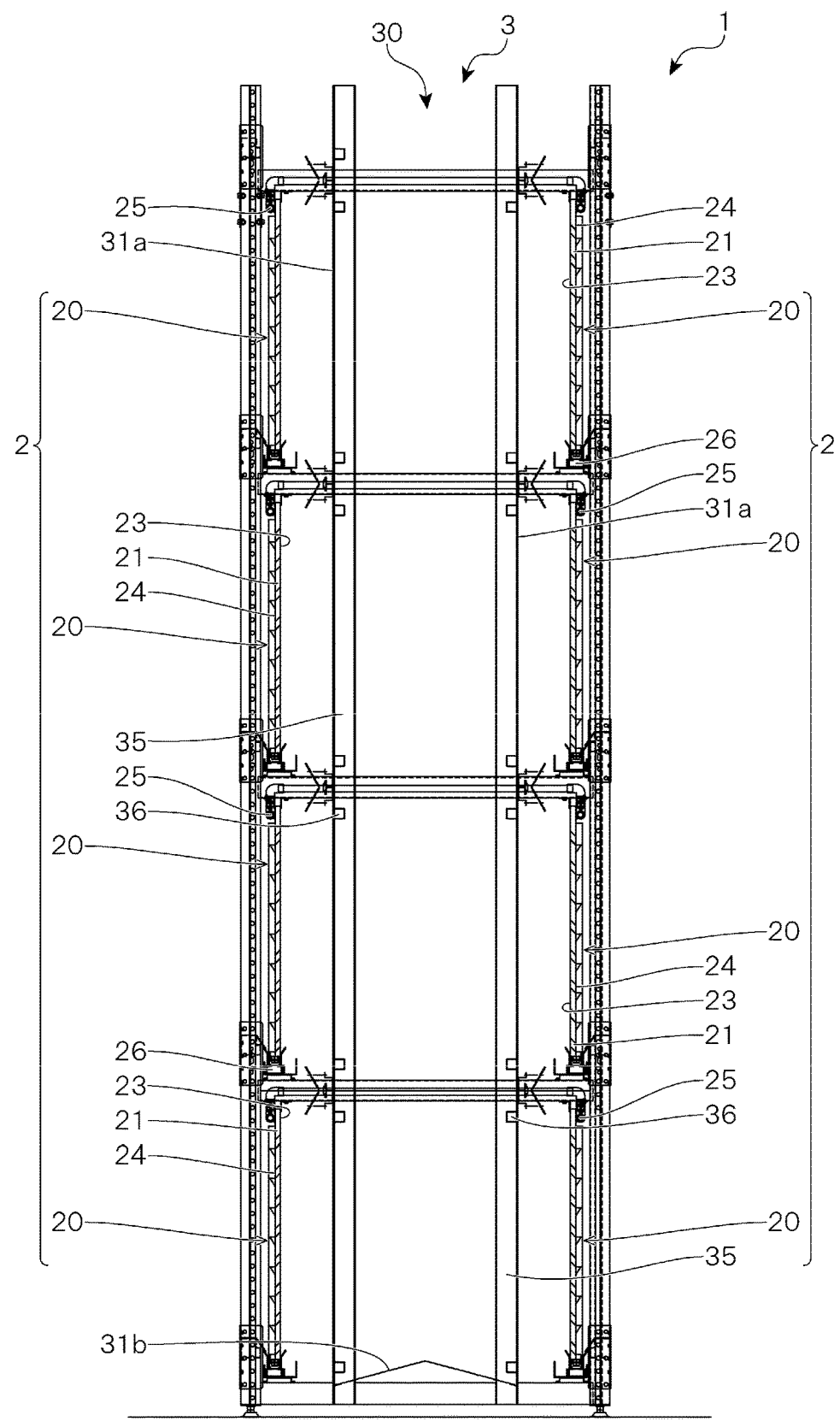
FIG. 1 is an explanatory and schematic longitudinal sectional view of the hydroponic system according to a first embodiment of the present invention.

Hereinbelow, preferable embodiments of the hydroponic system according to the present invention will be explained with reference to the drawings.

First Embodiment

First, an explanation will be made on the first embodiment of the hydroponic system according to the present invention.

A hydroponic system 1 according to the present embodiment is particularly suitable for cultivating leafy vegetables such as lettuce, green leaf, salad cabbage, potherb mustard, spinach, herbs, etc., and is provided with a hydroponic unit 2 in which culture panels 21 into which the seedlings p of these plants (culture objects) grown from seeds in seedling beds are transplanted are vertically arranged and a light-collecting apparatus 3 for taking natural light from the outside to irradiate the seedlings p transplanted into the culture panel 21 with the light.

As the culture panel 21, for example, a plate made of a synthetic resin such as polystyrene, polypropylene, polyethylene, polyurethane (including foamed board), a fiber board made of a fiber material such as a vegetable fiber, a resin fiber, an inorganic fiber or the like, wood, etc., can be used. However, no restrictions are imposed on the culture panel 21, as long as it is lightweight and has strength enough to withstand the weight of the culture object P that has grown.

In the culture panel 21, a plurality of planting holes 22 are bored for retaining the seedlings p that are transplanted. These planting holes 22 are arranged at appropriate intervals considering the size of the culture object P when it grows enough to be harvested, and bored at a prescribed angle with respect to the panel surface. When a liquid fertilizer is supplied to a liquid fertilizer supply surface 24 of the culture panel 21 as mentioned later, in order to prevent the liquid fertilizer from entering the culture surface 23 side of the culture panel 21 and touching parts other than roots of the culture object P, this angle θ is preferably 20 to 50° (see FIG. 3).

Not particularly shown, in order to transplant the seedlings p to the culture panel 21, the seedlings p are grown in a spongy bed that is cut in small pieces, and the seedlings may be retained in the planting holes 22 together with the bed, for example.

One of the panel surfaces of the culture panel 21 serves as a culture surface 23, and the other panel surface serves as a liquid fertilizer supply surface 24. When transplanting the seedlings p into the culture panel 21, transplantation is conducted such that the roots thereof grow along the liquid fertilizer supply surface 24. As a result, a liquid fertilizer (a liquid fertilizer obtained by dissolving a solid-state or a liquid-state fertilizer in water) supplied from the liquid fertilizer supply pipe 25 provided above the liquid fertilizing surface 24 runs down the liquid fertilizer supply surface 24 to reach every part of the roots of the seedlings p.

Although not particularly shown, a plurality of small holes are bored in the liquid fertilizer supply pipe 25 such that the liquid fertilizer that runs inside the pipe can flow down towards the liquid fertilizer supply panel 24 of the culture panel 21. By appropriately adjusting not only the position and the opening area of these holes, but also the flow rate and the flow speed of the liquid fertilizer, the liquid fertilizer can be uniformly supplied to the liquid fertilizer supply surface 24 of each culture panel 21.

Here, in the hydroponic system of Patent Document 1 mentioned above, the liquid fertilizer is sprayed in the form of mist. In this embodiment, the liquid fertilizer may be sprayed on the roots of the seedlings p in the form of mist, but in this case, care should be taken for maintenance in order to prevent occurrence of clogging. Therefore, in this embodiment, it is preferable to supply the liquid fertilizer to the roots of the seedlings p as mentioned above. By doing so, it is possible to supply the liquid fertilizer by a facility that is simpler and easier to maintain.

Further, if the culture panel 21 is arranged laterally, a culture bed for storing a liquid fertilizer has to be prepared in order to supply a liquid fertilizer to the seedlings p. As a result, a structure for supporting a heavy culture bed becomes necessary. On the other hand, by arranging the culture panel 21 vertically, and by supplying a liquid fertilizer to the roots of the seedlings p as mentioned above, provision of such a structure becomes unnecessary. As a result, not only equipment cost can be reduced, but also an increase in weight of the equipment can be suppressed.

On the liquid fertilizer supply surface 24 of the culture panel 21, in order to allow a liquid fertilizer to efficiently reach every part of the roots of the seedlings p that are transplanted, irregularities may be formed thereon or a liquid fertilizer pool in which a liquid fertilizer stays may be provided in the vicinity of the roots. However, no specific restrictions are imposed on the specific shape of the liquid fertilizer supply surface 24.

Figure 3:
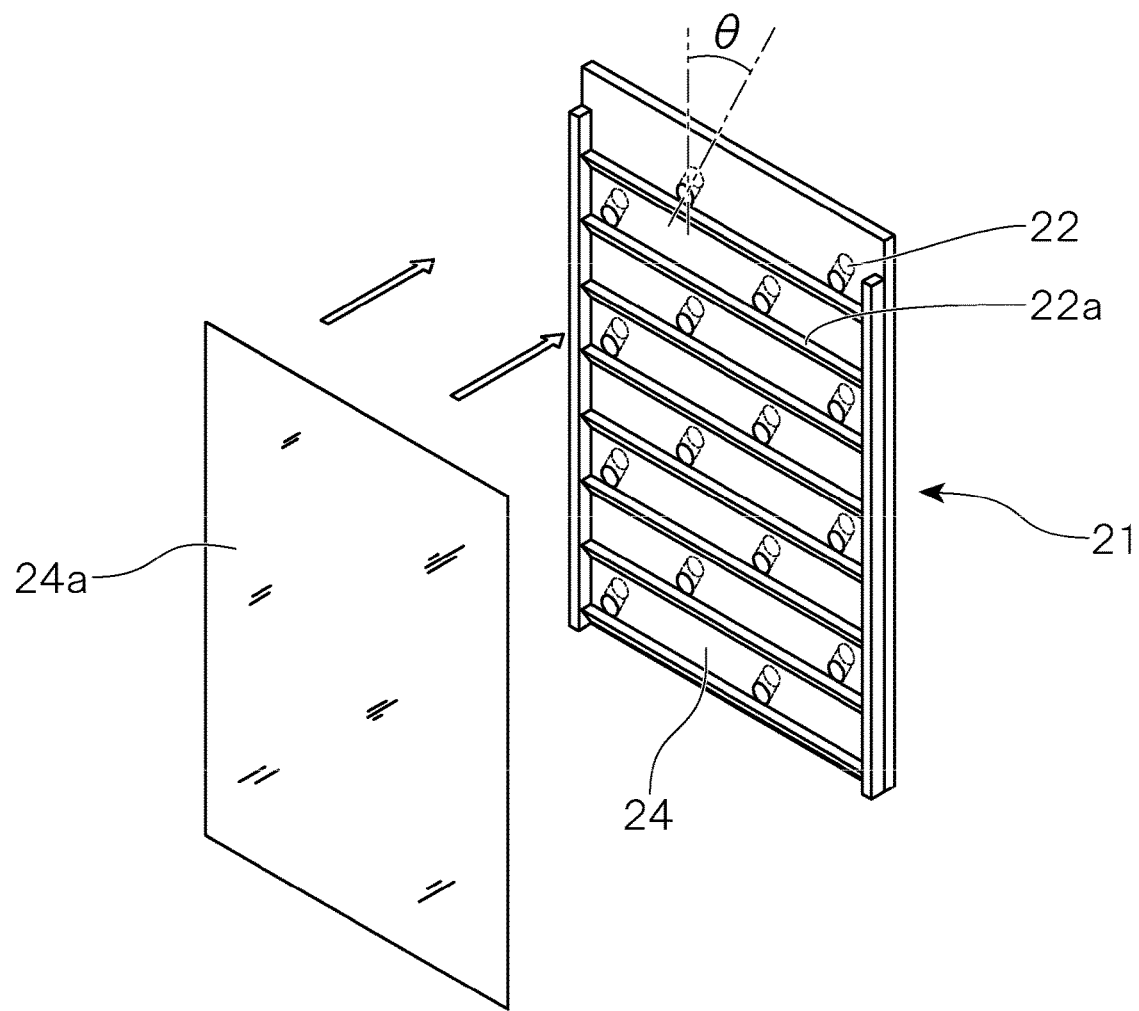
FIG. 3 is an explanatory perspective view of the liquid fertilizer supply side of one example of the hydroponic system according to the first embodiment of the present invention.

For example, as shown in FIG. 3, a ridge 22a may be formed along the row of the planting holes 22 and the liquid fertilizer supply surface 24 may be covered with the back panel 24a. By doing so, a liquid fertilizer that is supplied to the liquid fertilizer supply surface 24 flows down from a gap between the liquid fertilizer supply surface 24 and the back panel 24a while staying on the ridge 22a, whereby a liquid fertilizer can reach every part of the roots of the seedlings p that are transplanted.

Figure 4:
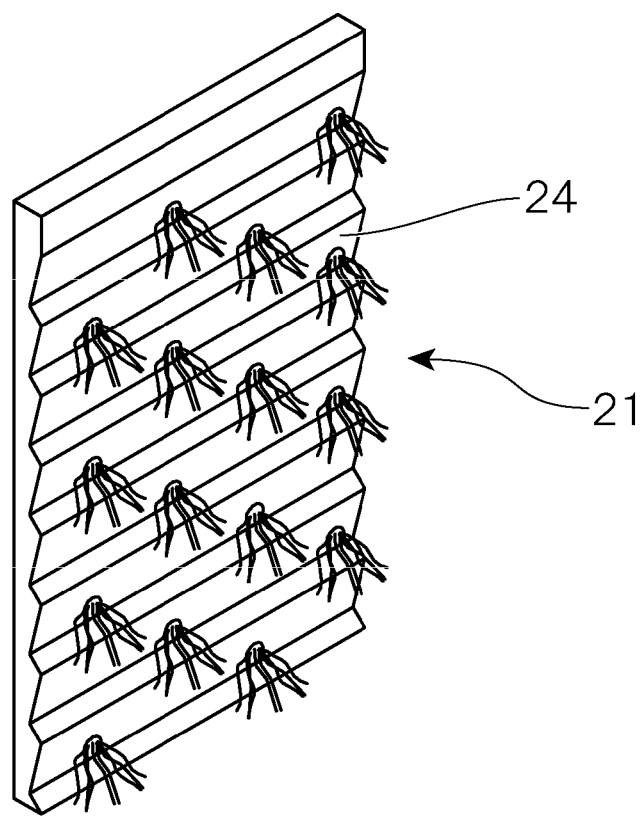
FIG. 4 is an explanatory perspective view of the liquid fertilizer supply side of another example of the hydroponic system according to the first embodiment of the present invention.

Further, on the liquid fertilizer supply surface 24, irregularities formed by combining inclined surfaces as shown in FIG. 4 may be provided such that a liquid fertilizer that flows down along these inclined surfaces can reach efficiently every part of the roots of the seedlings p that are transplanted.

In this embodiment, as long as such culture panels 21 are vertically arranged, no specific restrictions are imposed on the specific arrangement of the culture panels 21, etc. In the shown example, on guide rails 26 that are provided at each stage of frames assembled vertically in multiple stages, vertically-arranged plural culture panels 21 are aligned laterally while being supported such that they can slide in a lateral direction (see FIG. 2). In the guide rail 26 that is provided at each stage supporting the culture panel 21, a roller 27 that assists the lateral slide of the culture panel 21 may be arranged in a line.

In the shown example, the liquid fertilizer supply pipe 25 that supplies a liquid fertilizer to the liquid fertilizer supply surface 24 of the culture panel 21 is arranged at each stage, and the guide rail 26 that supports the culture panel 21 can be formed in the shape of a gutter that receives a liquid fertilizer that runs down along the liquid fertilizer supply surface 24 of the culture panel 21. At the same time, the liquid fertilizer received by the guide rail 26 that is formed in the shape of a gutter can be appropriately prepared and circulated to the liquid fertilizer supply pipe 25 and re-used.

Figure 2:
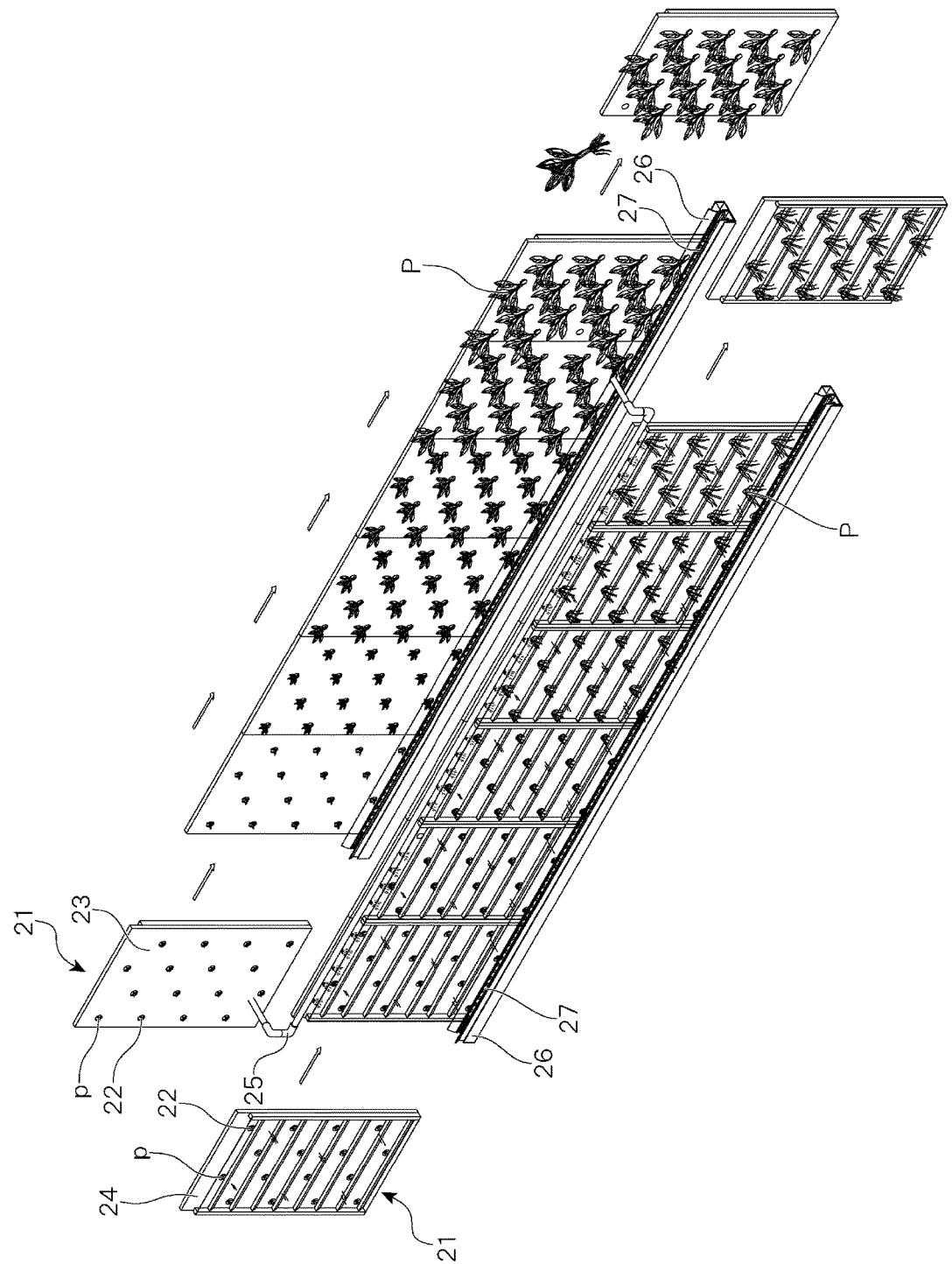
FIG. 2 is an explanatory and schematic perspective view of the culture block of the hydroponic system according to the first embodiment of the present invention.

As mentioned above, the hydroponic unit 2 according to the present embodiment comprises culture blocks 20 in which plural culture panels 21 are supported in a laterally-slidable way by the guide rail 26, and is configured as an assembly of the culture blocks 20 that is formed vertically in a stepwise manner. Then, as shown in FIG. 2, for each culture block 20, the culture panel 21 laterally slide (in the example shown in FIG. 2, laterally slide from the left to the right side) in accordance with the growth of the culture object P, and the culture panel 21 in which the culture object P is ready to be harvested is removed, and the culture panels 21 into which new seedlings are transplanted are supported by the guide rail 26. By repeating this operation, the culture object P can be harvested periodically.

In the hydroponic system of Patent Document 1, panels that are vertically arranged in multiple stages are allowed to slide in the vertical direction so as to replace them. For this reason, when removing the lowermost panel, it is necessary to fix the panel located above this panel with a stopper, and after removing the lowermost panel, all panels are required to slide vertically while taking care that the panels do not fall down, thereby making the work complicated. On the other hand, according to the present embodiment, since the culture block 20 is configured such that the culture panel 21 is supported in a laterally-slidable manner, the work of replacing the culture panels 21 is facilitated.

Figure 6:
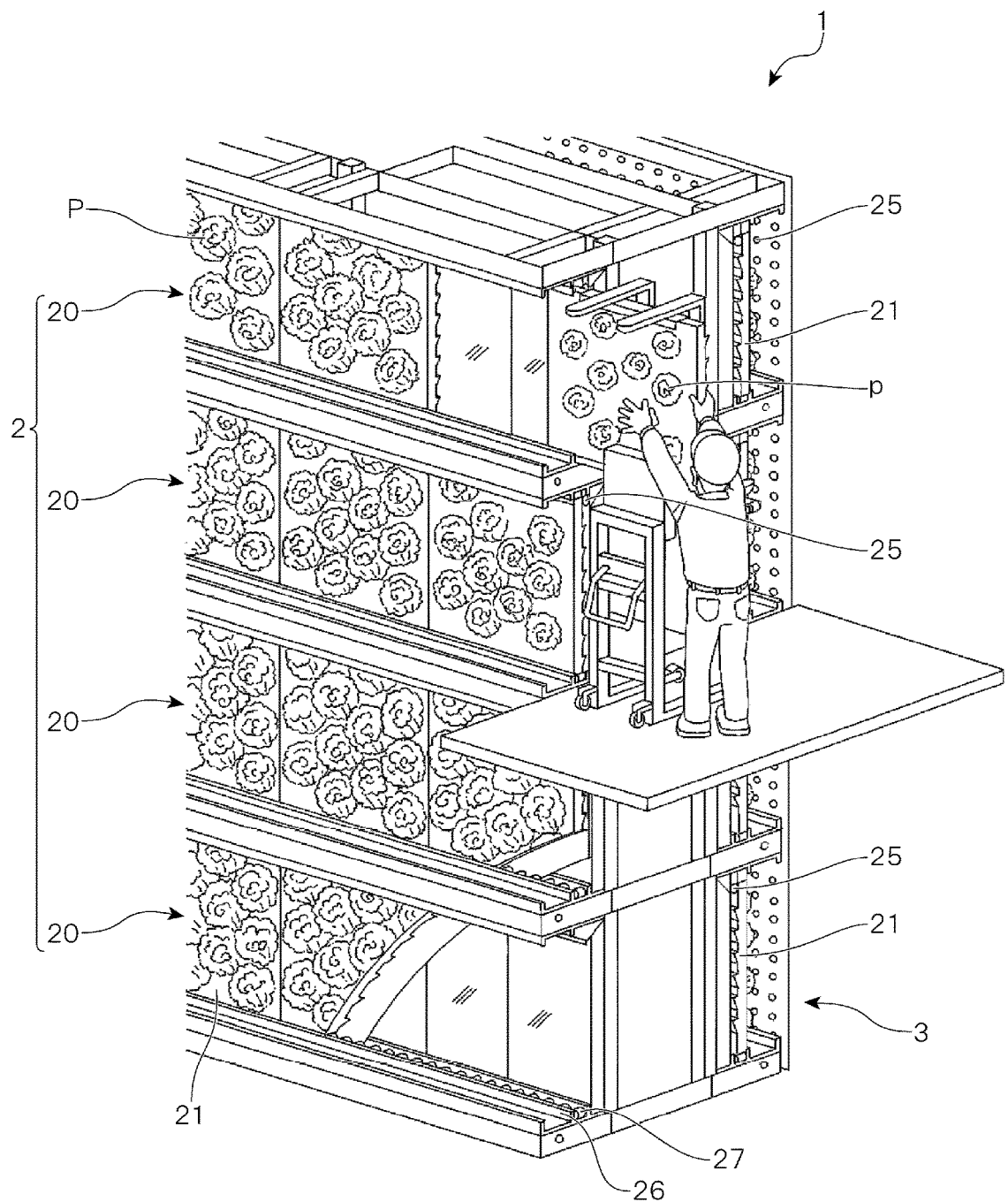
FIG. 6 is an explanatory view showing the manner of replacing work of the culture panel in the hydroponic system according to the first embodiment of the present invention.

FIG. 6 is an explanatory view showing the manner of the replacement of the culture panels 21.

In the present embodiment, as for a hydroponic unit 2, two hydroponic units 2 are arranged in pair such that the culture surfaces 23 of the culture panel 21 are opposed to each other. Between these paired two hydroponic units 2, a light-collecting apparatus 3 is provided to irradiate the seedlings p that are transplanted into the culture panel 21 of these hydroponic units 2 with natural light taken from the outside.

In the hydroponic system 1 of the present embodiment that has the above-mentioned configuration as a basic configuration, the two hydroponic units 2 that are arranged such that the culture surfaces 23 of the culture panels 21 are opposed to each other and the light-collecting apparatus 3 provided therebetween are provided as a constitutional unit, and the liquid fertilizer supply surface 24 of the culture panel 21 of the hydroponic unit 2 are faced with each other, whereby a plurality of these constitutional units can be arranged side by side.

The light-collecting apparatus 3 is provided with a pair of reflecting plate 31a that are vertically arranged in parallel with the culture surface 23 of the culture panel 21 provided in each hydroponic unit 2. The opposing surfaces of each pair of reflecting plates 31a are allowed to be a reflection surface of which the reflectance is enhanced. As a result, natural light taken from a light-collecting opening 30 provided above propagates downward while repeating reflection between the opposing reflection plates 31a.

In the shown example, the reflection plate 31a is fixed to a support column 35 provided vertically on the frame and a beam 36 intersecting with the support column 35 and assembled in a lattice shape.

As such reflecting plate 31a, it is possible to use a metal plate such as a steel plate, an aluminum plate, an aluminum alloy plate in which a layer composed of silver, a silver alloy, aluminum, a multi-layer film or the like are formed on the surface which serves as a reflectance surface in order to have an enhanced reflectance. When forming the reflecting plate 31a by using such a metal plate, the reflecting plate 31a may be formed of a single metal plate or may be formed by combining a plurality of the metal plates.

Figure 5:
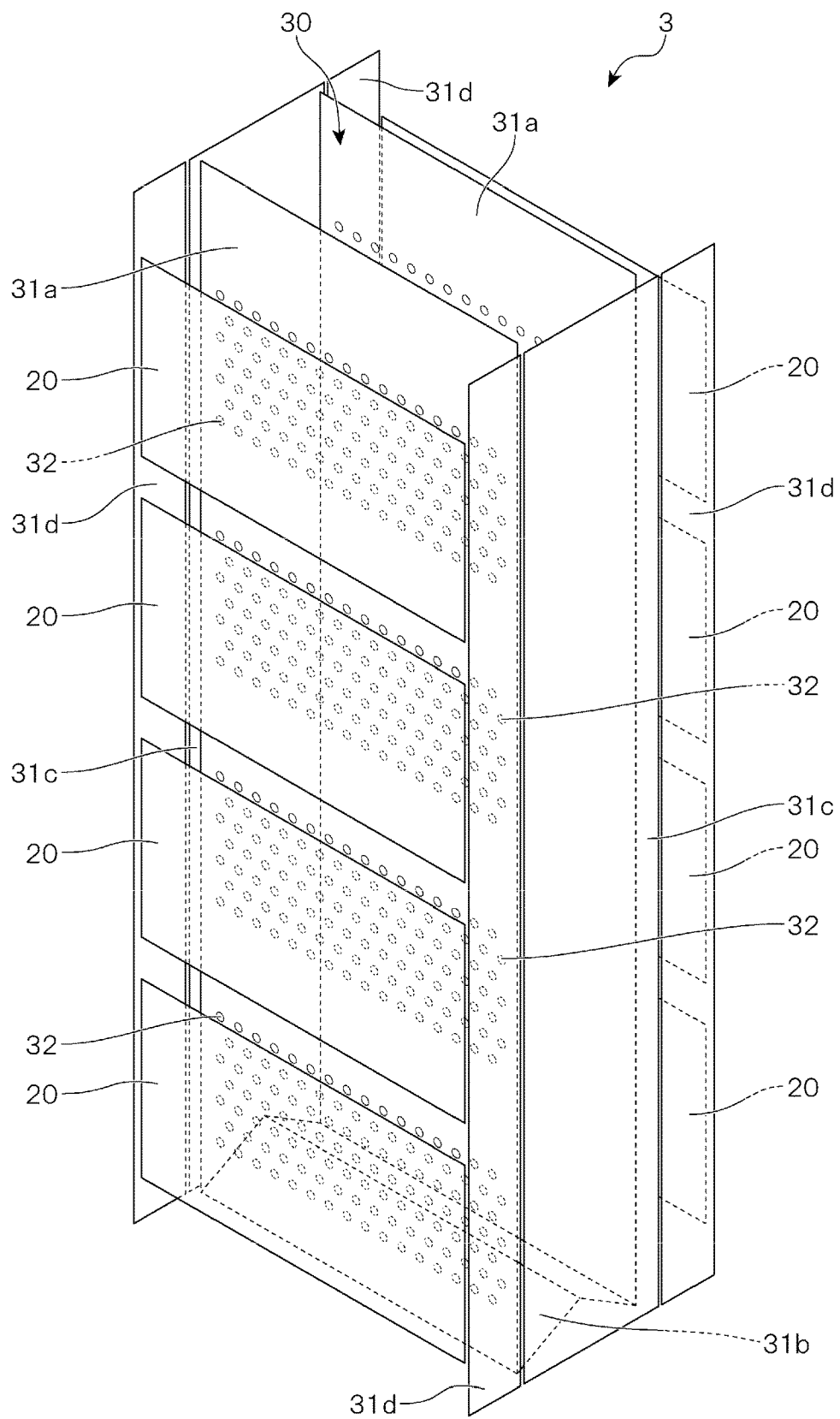
FIG. 5 is an explanatory and schematic perspective view of the hydroponic system according to the first embodiment of the present invention.

Further, in each reflecting plate 31a, a plurality of light-emitting holes 32 are bored at a predetermined opening ratio according to the position of the culture panel 21 (see FIG. 5). As a result, during a process in which natural light taken from the light-collecting opening 30 propagates while repeatedly reflected by opposing reflecting surfaces of a reflecting plates 31a, the seedlings p that are transplanted into the culture panel 21 are irradiated with the light through the light-emitting hole 32 bored in the reflecting plate 31a in a spotwise manner.

FIG. 5 is an explanatory and schematic perspective view of the hydroponic system according to the present embodiment, and shows only main constitutional elements excluding a frame or the like.

The height of the light-collecting apparatus 3 is equal to or higher than the height of the hydroponic unit 2 in order to allow the seedlings p that are transplanted into the culture panel 21 that are vertically arranged to be irradiated with natural light that is taken from the light-collecting opening 30. The light reflecting plate 31a can be divided such that the divided panels can correspond to one or two or more culture panels 21 arranged laterally.

The light-collecting apparatus 3 has, on its bottom side, a bottom part reflecting plate 31b that reflects light which propagates within the light-collecting apparatus 3 and reaches the bottom surface side towards the light reflecting plate 31a. It is preferred that the bottom side reflection plate 31b be formed in a mountain-like shape with a prescribed apex angle by using the same metal plate as that used for the reflecting plate 31a such that the light which reaches the bottom side is uniformly reflected towards each of the opposing reflecting plates 31a.

It is preferred that the light-collecting apparatus 3 have a side part reflecting plate 31c to prevent leakage of light from the side. The side part reflecting plate 31c also can be formed by using the same metal plate as that used for the reflecting plate 31a.

Further, in order to allow the seedlings p transplanted into the culture panel 21 to be irradiated with light emitted from the light-collecting apparatus 3 without waste, it is preferred that, on the side part of a space between the light-collecting apparatus 3 and the hydroponic unit 2 (culture space), a side surrounding member that surrounds the space be provided. In order to provide the side surrounding member, as shown in FIG. 5, a reflecting side plate 31d of which the surface faces the space may be arranged in parallel with the side part reflecting plate 31c of the light-collecting apparatus 3. Alternatively, the side part reflecting plate 31c may be extended to the hydroponic unit 2 side. In the latter case, since the number of members constituting the hydroponic system 1 is not increased, it is advantageous in respect of management of members or production cost.

By doing so, not only leakage of light from culture space can be suppressed, but also supply of carbon dioxide to the culture space formed between the light-collecting apparatus 3 and the hydroponic unit 2 or air conditioning of said space can be effectively conducted.

Further, in order to allow the seedlings p transplanted into the culture panel 21 to be irradiated with light emitted from the light-collecting apparatus 3 without waste, it is preferred that the surface of the reflecting plate 31a facing the culture panel 21 be a reflecting surface. Such a reflecting surface is preferably a diffused reflecting surface.

In the hydroponic system 1 according to the present embodiment, by vertically arranging the culture panels 21 into which the seedlings p as the culture object are transplanted, the culture area can be widened and the amount of harvest can be increased. Further, by the light-collecting apparatus 3 having a pair of reflecting plates 31a that is vertically arranged in parallel with the culture surface 23 of the culture panel 21, during the process in which the natural light taken from the light-collecting opening propagates while repeatedly being reflected by the reflecting surface of the reflecting plate 31a, by allowing the seedlings p transplanted to the culture panel 21 to be irradiated with light emitted from the light-emitting hole 32 bored in the reflecting plate 31a, the culture object P can be efficiently grown at a low cost and at a high culture density.

Further, the light-collecting apparatus 3 is configured as a vertical light-collecting apparatus having a pair of reflecting plates 31a that are vertically provided in parallel with the culture surface 23 of the culture panel 21. Since the light-collecting opening can be provided on the top of a building, freedom in installation with respect to the position of the sun is high.

When the light-collecting apparatus is configured such that the reflecting plate is arranged laterally, if the light-collecting opening is provided on the top of the building, an additional light-guiding means for guiding light becomes necessary, whereby the structure of a system becomes complicated. Further, if the light-collecting opening is provided on the wall surface of a building, no such light-guiding means becomes necessary. However, according to the position of the sun, there may be a certain period of time during which light collection cannot be conducted.

As mentioned above, according to the present embodiment, in addition to vertical provision of the culture panel 21, by configuring a system by the light-collecting apparatus 3 having a pair of reflecting plates 31a that are vertically provided in parallel with the culture surface 23 of the culture panel 21, the culture object P can be efficiently grown with a simple system configuration at a low cost and at a high culture density.

Second Embodiment

Next, the second embodiment of the hydroponic system according to the present invention will be explained.

Figure 7:
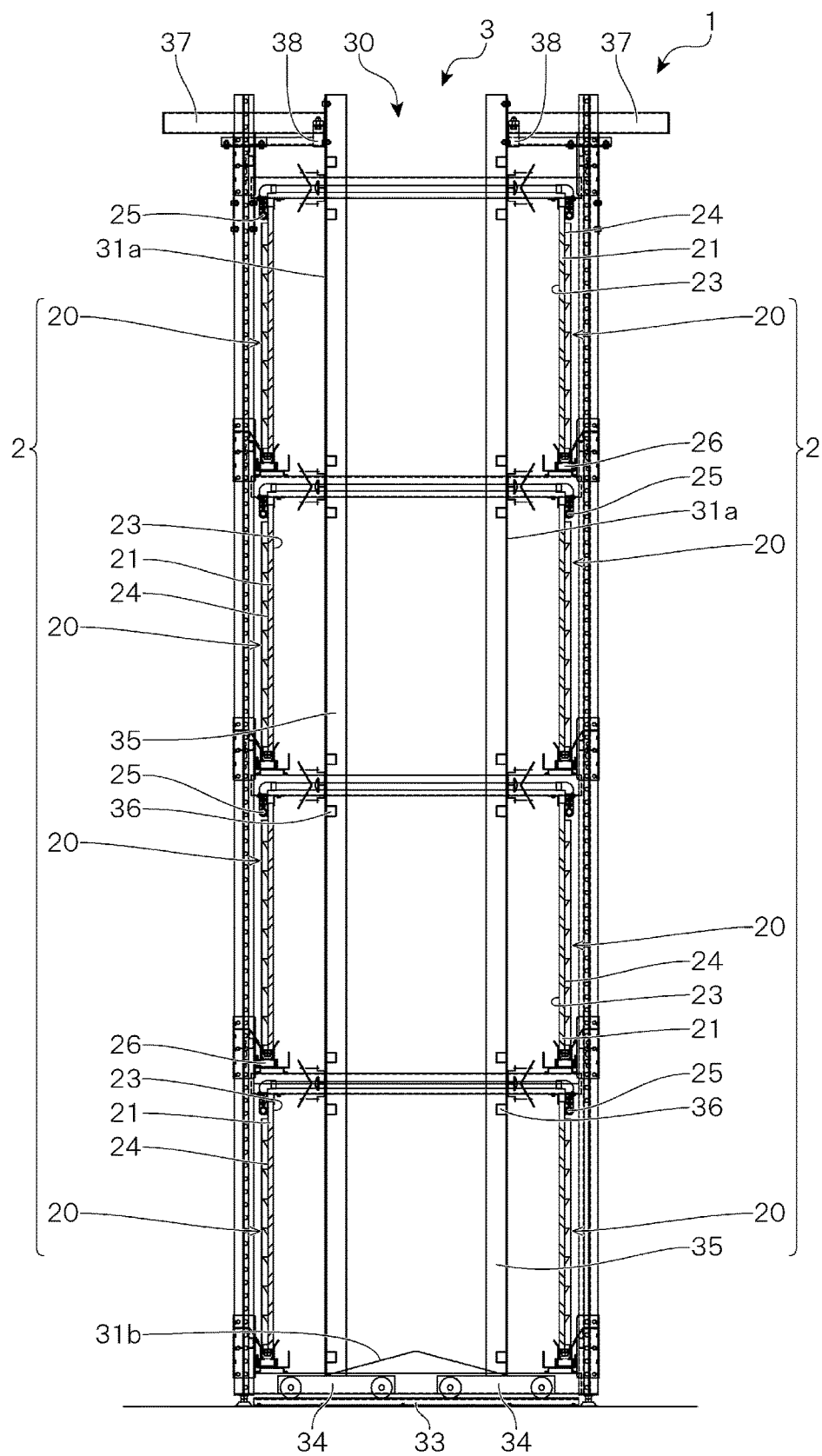
FIG. 7 is an explanatory and schematic longitudinal sectional view of the hydroponic system according to a second embodiment of the present invention.
Figure 8:
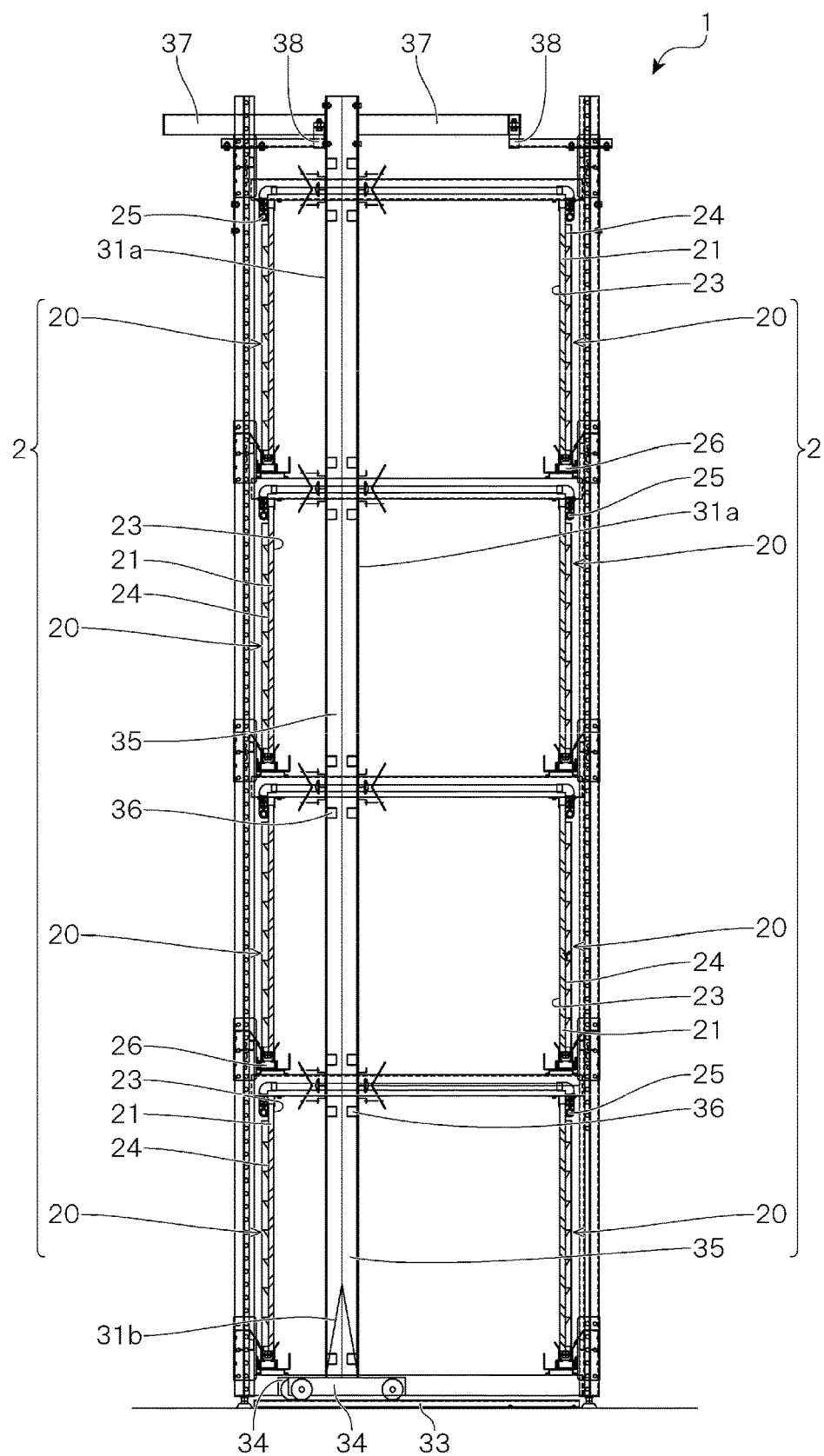
FIG. 8 is an explanatory and schematic longitudinal sectional view of the hydroponic system according to the second embodiment of the present invention.

In the present embodiment, as shown in FIGS. 7 and 8, each of the pair of reflecting plates 31a that are vertically provided in parallel with the culture surface 23 of the culture panel 21 provided in the hydroponic unit 2 are movable from an approaching position to a leaving position relative to the hydroponic unit 2.

The example shown in FIG. 7 shows the state in which the reflecting plate 31a is at an approaching position relative to the hydroponic unit 2, and the example shown in FIG. 8 shows a state in which one of the reflecting plate 31a is at a leaving position relative to the hydroponic unit 2.

In the examples shown in these figures, the reflecting plate 31a is fixed to a support column 35 vertically provided on a carriage 34 moving on the rail 33, and a beam 36 intersecting with the support column 35 and assembled in a lattice pattern, and is movable from the approaching position to the leaving position relative to the hydroponic culture unit 2.

In order to prevent the reflecting plate 31a from falling, a support member 37 that vertically protrudes towards the hydroponic unit 2 is fixed on the upper end side of the reflecting plate 31a, and the support member 37 is slidably supported by a guiding member 38 that is fixed to the frame.

By leaving the reflecting plate 31a from the hydroponic unit 2, a working space for maintenance of the hydroponic unit 2 can be ensured. Further, in order to prevent the culture object that has grown from contacting the reflecting plate 31a, in accordance with the growth of the culture object P, the reflecting plate 31a can be gradually left from the culture object P, while preventing an amount of light irradiated on the culture object P from decreasing as much as possible. Further, if the distance between the hydroponic unit 2 and the reflecting plate 31a is narrow, air stagnates therebetween, and as a result, occurrence of disadvantages is concerned that carbon dioxide required for the growth of the culture object P becomes insufficient or temperature becomes un-uniform. In order to suppress occurrence of such a disadvantage, according to need, by leaving the reflecting plate 31a from the hydroponic unit 2 to secure a prescribed space, ventilation is improved to accelerate the circulation of air.

As mentioned above, when allowing each of the pair of reflecting plates 31a to be movable from the approaching position to the leaving position relative to the hydroponic unit 2, it is preferred that the bottom part reflecting plate 31b be formed by combining the same metal plates as those used in the reflecting plate 31a in a mountain-like shape with a prescribed apex angle such that it can be bent at the top. When leaving at least one of the pair of the reflecting plates 31a from the culture unit 2, it is preferred that move of the reflecting plate 31a be not prevented by allowing the top of the bottom part reflecting plate 31b to rise up while bending (see FIG. 8).

In the case of providing the side part reflecting plate 31c at the side of the light-collecting apparatus 3, when a working space is ensured between the hydroponic unit 2 by leaving one of the reflecting plates 31a from the hydroponic unit 2, in order to allow an operator to enter the working space, it is preferred that one or both side part reflecting plate(s) 31c be openable and closable in the form of a sliding door or a hinged door.

The present embodiment differs from the first embodiment in the above-mentioned points, and since other configurations are the same as those of the first embodiment, an explanation thereof is omitted.

Hereinabove, the present invention is explained with reference to preferable embodiments. The present invention is not restricted to the above-mentioned embodiments, and it is needless to say that various modifications are possible within the scope of the present invention.

For example, according to the present invention, the culture object P can be efficiently grown at a low cost and at a high culture density by irradiating the culture object P with natural light that is taken from the outside. Without a range that does not significantly deteriorate the advantageous effects of the present invention, an artificial light source such as a fluorescent lamp, a light-emitting diode and an organic EL can be auxiliary used in combination.

In the light-collecting apparatus 3 that takes natural light from the outside and irradiates the culture object P with the natural light, in order to improve the amount of light collected, a sunlight tracking device, a condensing lens, etc. may be provided.

The documents described in the specification and the specification of Japanese application(s) on the basis of which the present application claims Paris convention priority are incorporated herein by reference in its entirety.

INDUSTRIAL APPLICABILITY

The present invention can be preferably used as a hydroponic system that grows the culture object efficiently at a high culture density at plant factories.

DESCRIPTION OF REFERENTIAL NUMERALS

1. Hydroponic system
2. Hydroponic unit
20. Culture block
21. Culture panel
22. Planting holes
23. Culture surface 26. Guide rail
3. Light-collecting apparatus
30. Light-collecting opening
31a. Reflecting plate
31b. Bottom part reflecting plate
31c. Side part reflecting plate
31d. Reflecting side plate
32. Light-emitting hole
P. Culture object
p. Seedlings

The invention claimed is:

1. A hydroponic system comprising:
   a hydroponic unit including a culture panel which is vertically arranged, the culture panel being configured to be planted with a seedling as a culture object; and
   a light-collecting apparatus that receives natural light from the outside and irradiates the seedling planted into the culture panel with the natural light, wherein
   the light-collecting apparatus includes a light-collecting opening and a pair of reflecting plates that are vertically provided in parallel with a culture surface of the culture panel provided in the hydroponic unit, wherein each of the reflecting plates includes a reflecting surface, the reflecting surfaces of the pair of the reflecting plates facing each other, and wherein at least one of the reflecting plates includes a light-emitting hole bored in the reflecting plate,
   the light-collecting apparatus is configured so that the natural light received from the light-collecting opening is propagated by repeated reflection between the reflecting surfaces, a portion of the natural light passing through the light-emitting hole and irradiating the seedling planted into the culture panel,
   each of the reflecting plates is movable from an approaching position to a leaving position relative to the hydroponic unit,
   the light-collecting apparatus has a bottom part reflecting plate provided at a bottom of the light-collecting apparatus that reflects light that propagates between the reflecting surfaces and that reaches the bottom of the light-collecting apparatus towards at least one of the vertically provided reflecting plates, wherein the bottom part reflecting plate includes an apex portion which is bendable at a top of the bottom part reflecting plate,
   the bottom part reflecting plate is formed in a mountain-like shape, and
   as a distance between at least one of the movable reflection plates and the culture panel increases, the top of the bottom part reflecting plate rises while an apex angle of the apex portion changes.

2. The hydroponic culture system according to claim 1, wherein, on a side part of a space between the light-collecting apparatus and the hydroponic unit, a side part-surrounding member that surrounds the space is provided.

3. The hydroponic system according to claim 1, wherein a surface of one of the pairs of the reflecting plates facing the culture panel is a reflecting surface.

4. The hydroponic system according claim 1, wherein the hydroponic unit comprises culture blocks in which a plurality of the culture panels are supported by a guide rail in a laterally-slidable manner.

5. The hydroponic system according to claim 4, wherein the hydroponic unit is configured as an assembly of the culture blocks that are formed in a vertically stepwise manner.

* * * * *